(12) United States Patent
Kinnou et al.

(10) Patent No.: US 10,266,039 B2
(45) Date of Patent: Apr. 23, 2019

(54) STRUCTURE FOR REAR PART OF VEHICLE

(71) Applicant: MAZDA MOTOR CORPORATION, Hiroshima (JP)

(72) Inventors: Kenji Kinnou, Hiroshima (JP); Motoharu Sato, Aki-gun (JP); Hiroshi Sakai, Hiroshima (JP); Yusuke Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 235 days.

(21) Appl. No.: 15/110,195

(22) PCT Filed: Feb. 24, 2015

(86) PCT No.: PCT/JP2015/055299
§ 371 (c)(1),
(2) Date: Jul. 7, 2016

(87) PCT Pub. No.: WO2015/137111
PCT Pub. Date: Sep. 17, 2015

(65) Prior Publication Data
US 2016/0332510 A1    Nov. 17, 2016

(30) Foreign Application Priority Data
Mar. 11, 2014 (JP) ................................. 2014-047331

(51) Int. Cl.
*B60J 5/10* (2006.01)
*B60Q 1/26* (2006.01)
(Continued)

(52) U.S. Cl.
CPC ............. *B60J 5/107* (2013.01); *B60J 5/101* (2013.01); *B60Q 1/263* (2013.01); *B60Q 1/30* (2013.01); *B60Q 1/44* (2013.01)

(58) Field of Classification Search
CPC .............. B60J 5/101; B60J 5/107; B60Q 1/30
See application file for complete search history.

(56) References Cited

U.S. PATENT DOCUMENTS

| 4,838,603 A | 6/1989 | Masoero et al. |
| 9,586,519 B1 * | 3/2017 | Salter ....................... B60Q 1/30 |

(Continued)

FOREIGN PATENT DOCUMENTS

| CN | 103153702 A | 6/2013 |
| CN | 203460991 U | 3/2014 |

(Continued)

OTHER PUBLICATIONS

International Search Report issued in PCT/JP2015/055299; dated May 26, 2015.

(Continued)

*Primary Examiner* — Alexander K Garlen
*Assistant Examiner* — Christopher E Dunay
(74) *Attorney, Agent, or Firm* — Studebaker & Brackett PC

(57) ABSTRACT

A rear part structure of a vehicle includes a lift gate; a light source device to be covered by the lift gate when the lift gate is closed; a lens member mounted in such a manner as to cover an opening portion in the lift gate, and configured to transmit light from the light source device when the lift gate is closed; at least one of a light source mounting portion for movably mounting the light source device with respect to a vehicle body, and a lens mounting portion for movably mounting the lens member with respect to the lift gate; and a positioning portion which causes, when the light source device and the lens member do not have a predetermined positional relationship therebetween, at least one of the light source device and the lens member to move into the predetermined positional relationship when the lift gate is closed.

5 Claims, 14 Drawing Sheets

(51) Int. Cl.
 *B60Q 1/30* (2006.01)
 *B60Q 1/44* (2006.01)

(56) References Cited

U.S. PATENT DOCUMENTS

| | | |
|---|---|---|
| 2006/0017304 A1 | 1/2006 | Bischoff et al. |
| 2010/0157617 A1* | 6/2010 | Schwab ............... B60Q 1/0408 362/511 |
| 2013/0182450 A1 | 7/2013 | Buisson |
| 2014/0003075 A1 | 1/2014 | Yamada et al. |
| 2014/0097644 A1* | 4/2014 | Kurita ................... B62D 25/02 296/193.08 |

FOREIGN PATENT DOCUMENTS

| | | |
|---|---|---|
| EP | 2 653 332 A2 | 10/2013 |
| JP | S56-070343 U | 6/1981 |
| JP | H03-051633 U | 5/1991 |
| JP | 2002-029261 A | 1/2002 |
| JP | 2005-022581 A | 1/2005 |
| JP | 2007-196957 A | 8/2007 |
| JP | 4160584 B2 | 10/2008 |
| JP | 4257249 B2 | 4/2009 |
| JP | 2010-228696 A | 10/2010 |
| JP | 2012-144134 A | 8/2012 |
| JP | 2012-256457 A | 12/2012 |
| JP | 2013-220785 A | 10/2013 |
| JP | 2014-008876 A | 1/2014 |

OTHER PUBLICATIONS

An Office Action issued by the Chinese Patent Office dated Jul. 28, 2017, which corresponds to Chinese Patent Application No. 201580010301.5 and is related to to U.S. Appl. No. 15/110,195, with an English summary.

* cited by examiner

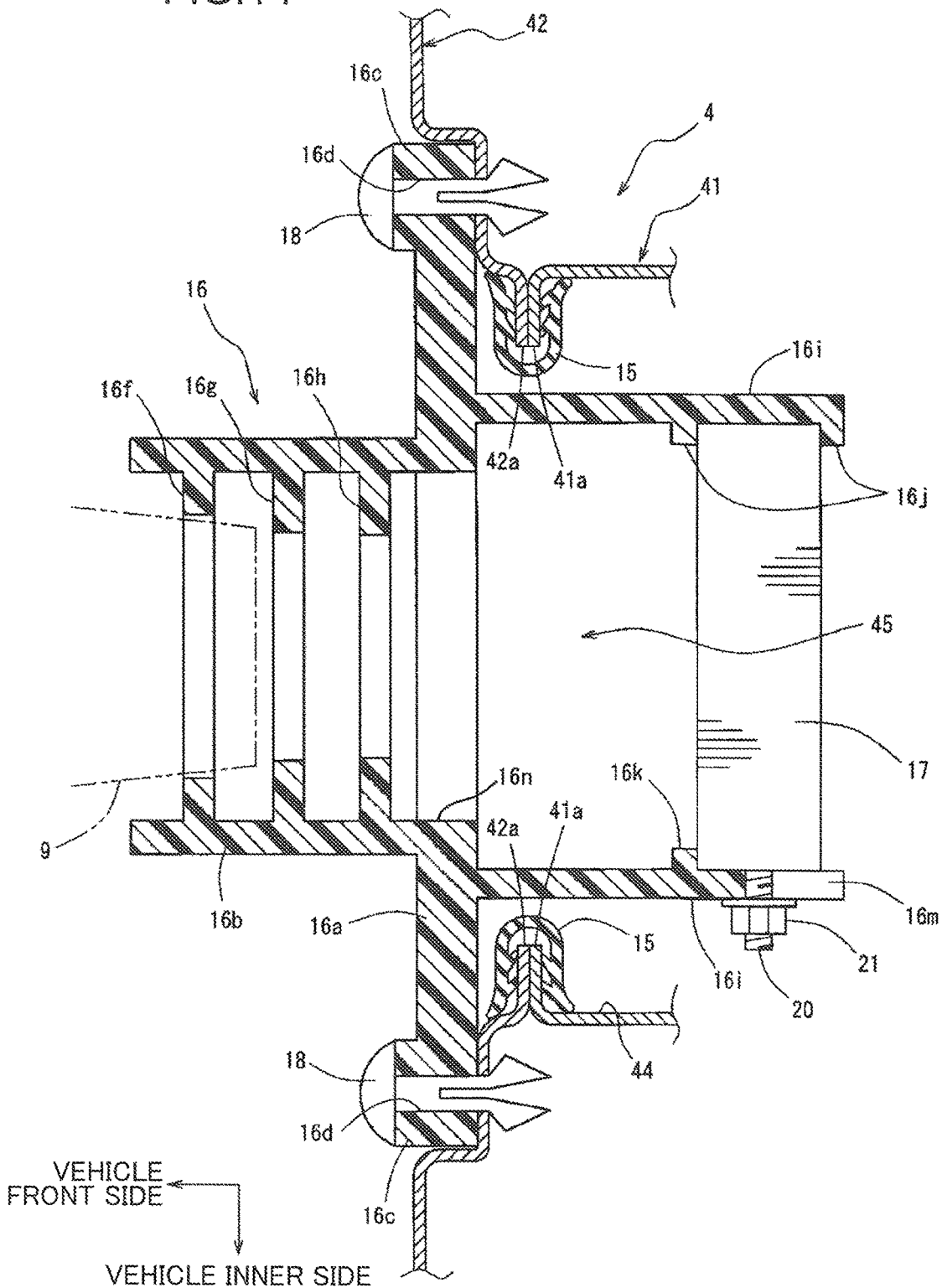

STRUCTURE FOR REAR PART OF VEHICLE

TECHNICAL FIELD

The present invention relates to a rear part structure of a vehicle, which is provided with a lift gate configured to openably close a vehicle body opening formed in a rear part of the vehicle.

BACKGROUND ART

Generally, when a light source device as a tail lamp is provided at a rear part of a vehicle, it may be preferable to dispose the light source device transversely in such a manner as to extend in the vehicle width direction, rather than disposing the light source device longitudinally in such a manner as to extend in the up-down direction in terms of design. However, there is a problem that a vehicle body opening may be narrowed when a light source device is transversely disposed in such a manner as to extend in the vehicle width direction.

In view of the above, Patent Literatures 1 to 4 propose a configuration, in which a light source device is disposed at a periphery of a vehicle body opening, which is formed in a rear part of a vehicle, and the light source device is covered by a lift gate mounted on a vehicle body in such a manner as to openably close the vehicle body opening. The configuration disclosed in Patent Literatures 1 to 4 provides an advantage that it is possible to implement a unique design by differentiating the external appearance of a light source device between when a lift gate is opened and when the lift gate is closed, while securing the width of a vehicle body opening.

When a light source device is covered by a lift gate as described above, a lens member for light adjustment may be provided on the lift gate so that light from the light source device is irradiated in an appropriate range viewable from the vehicle rear side. In this case, particularly when the light source device is functioned as a brake lamp, it is necessary to design the light source device, the lens member, and the layout of these members, taking into consideration visibility from the vehicle rear side so that a predetermined irradiation state is secured.

Conventionally, however, it is a general practice to use a component called as a rear combination lamp. The rear combination lamp is a sub-assembly constituted by a light source and a lens. The sub-assembly is integrally fixed to a vehicle body or a lift gate. In the aforementioned configuration, by appropriately adjusting a positional relationship between a light source and a lens in advance in forming the light source and the lens into a sub-assembly, basically, there is no likelihood that the positional relationship between the light source and the lens may be deviated.

As described above, when a light source device is mounted on a vehicle body, and when a lens member is mounted on a lift gate connected to the vehicle body by a hinge, as compared with the aforementioned configuration of a rear combination lamp, a positional relationship between the light source device and the lens member in a state that the lift gate is closed is likely to be deviated due to a mounting error, a dimension error (positional deviation) of a hinge, or a like factor. Further, repeating an opening/closing operation of a lift gate may cause a deviation in positional relationship between a vehicle body and the lift gate.

As described above, if a positional relationship between a light source device and a lens member deviates when a lift gate is closed, an irradiation state by the lens member may be deviated from an initially intended state when the light source device is turned on.

CITATION LIST

Patent Literature

Patent Literature 1: Japanese Unexamined Utility Model Publication No. S56-70343
Patent Literature 2: Japanese Unexamined Utility Model Publication No. H3-51633
Patent Literature 3: Japanese Patent No. 4160584
Patent Literature 4: Japanese Unexamined Patent Publication No. 2010-228696

SUMMARY OF INVENTION

An object of the present invention is to provide a rear part structure of a vehicle, which enables to implement a unique design by differentiating the external appearance of a light source device between when a lift gate is opened and when the lift gate is closed, and which enables to secure an appropriate irradiation state through a lens member when the light source device is turned on, even if a mounting error or a positional deviation occurs.

In order to solve the aforementioned problem, a rear part structure of a vehicle of the present invention includes a lift gate which openably closes a vehicle body opening formed in a rear part of the vehicle; a light source device disposed on a periphery of the vehicle body opening, and covered by the lift gate when the lift gate is closed; a lens member mounted in such a manner as to cover an opening portion formed in the lift gate in order to transmit light from the light source device toward a rear side of the vehicle, the lens member being configured to transmit light from the light source device when the lift gate is closed; at least one of a light source mounting portion and a lens mounting portion, the light source mounting portion being configured to movably mount the light source device with respect to a vehicle body, the lens mounting portion being configured to movably mount the lens member with respect to the lift gate; and a positioning portion which causes, when the light source device and the lens member do not have a predetermined positional relationship therebetween, at least one of the light source device and the lens member to move into the predetermined positional relationship when the lift gate is closed.

BRIEF DESCRIPTION OF DRAWINGS

FIG. 14 is a sectional side view illustrating a second embodiment of the present invention, specifically, a state that a light shielding member and an inner lens are fixed to a lift gate.

DESCRIPTION OF EMBODIMENTS

In the following, embodiments of the present invention are described in details based on the drawings.

Figure 1:
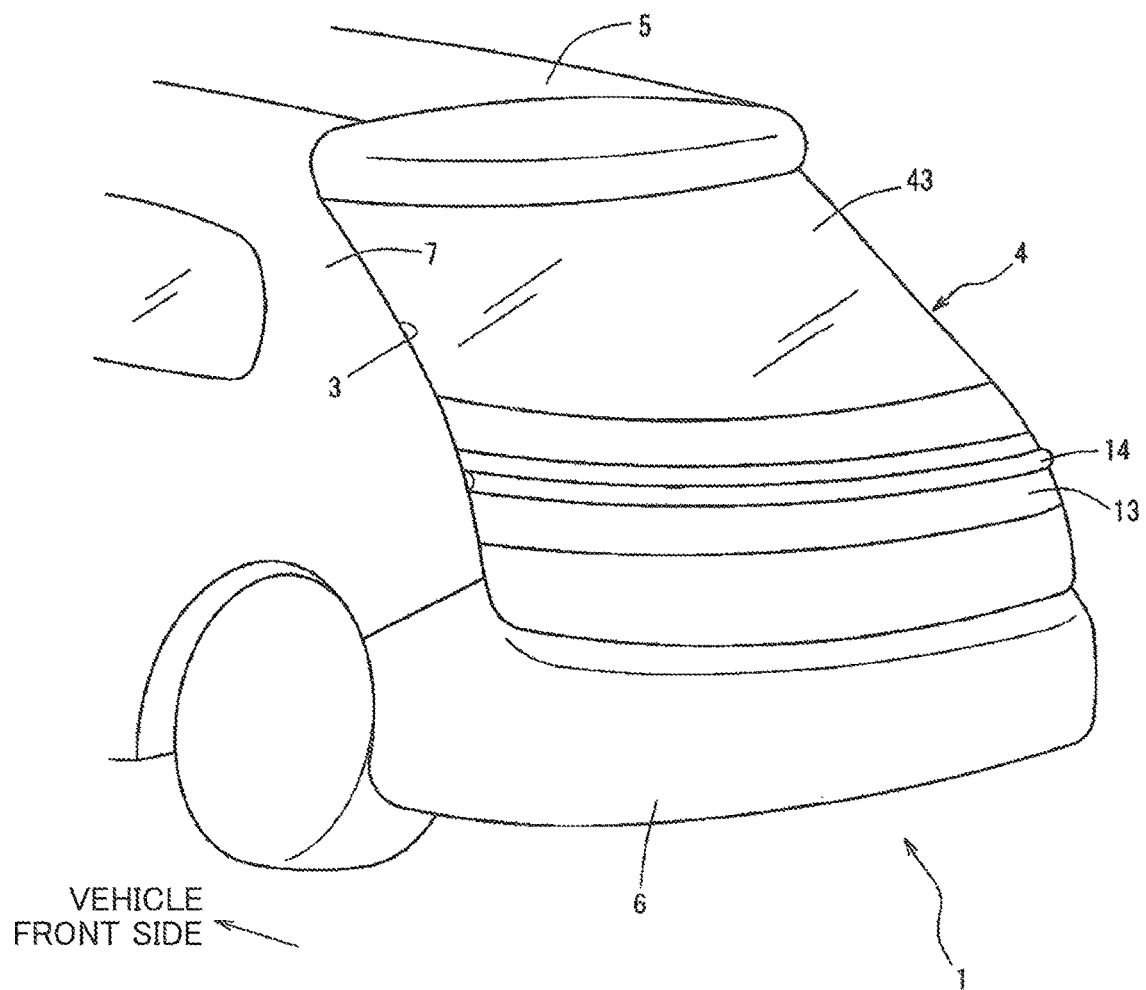
FIG. 1 is a perspective view illustrating a rear part of a vehicle according to a first embodiment of the present invention.
Figure 2:
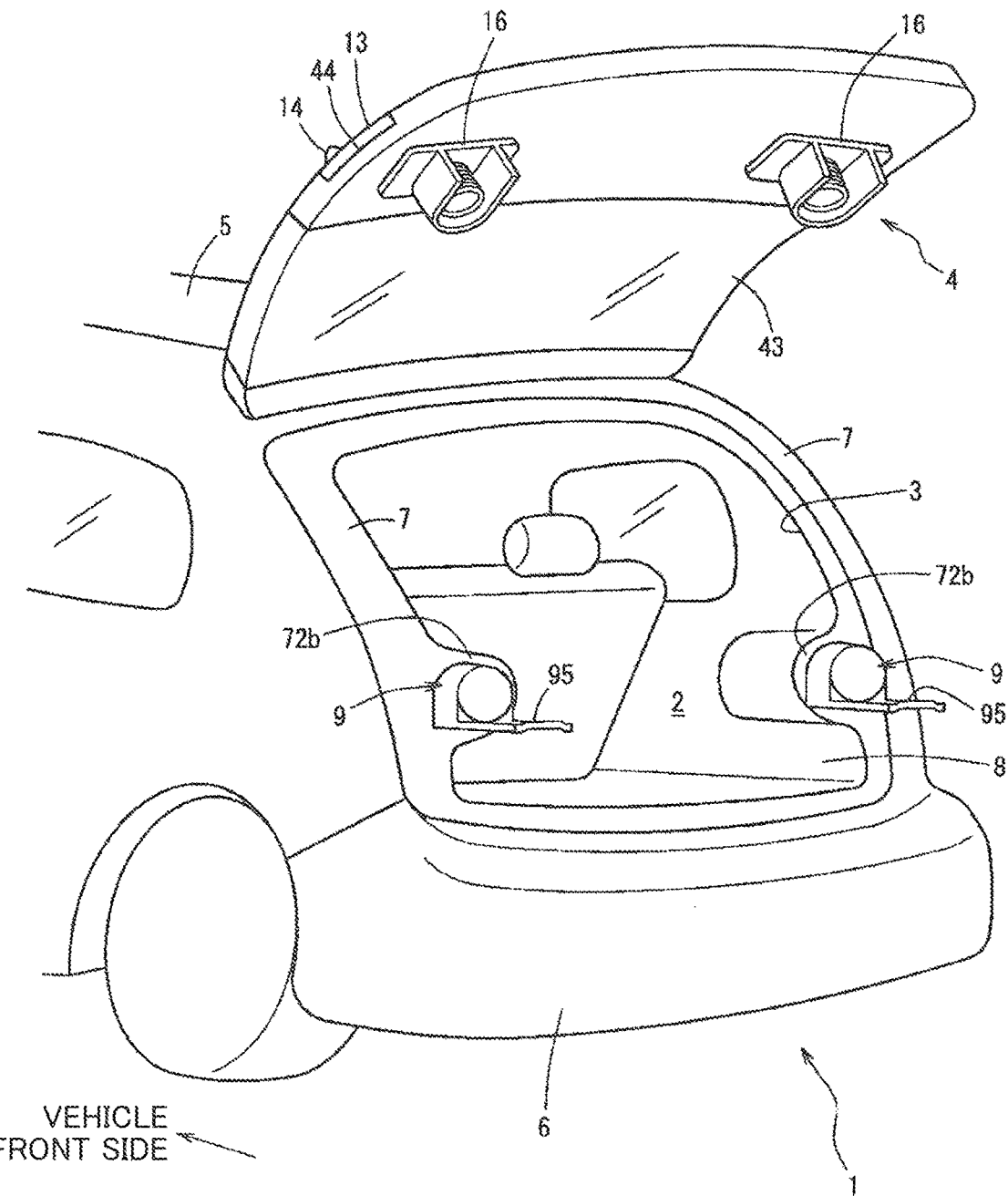
FIG. 2 is a perspective view illustrating a state when a lift gate is opened.

FIG. 1 and FIG. 2 are perspective views illustrating a rear part of a vehicle 1 according to a first embodiment of the present invention. FIG. 1 illustrates a state when a lift gate 4 is closed. FIG. 2 illustrates a state when the lift gate 4 is opened. The vehicle 1 illustrated in FIG. 1 is a vehicle of a hatch back type. A vehicle body opening 3 for allowing a user to access a vehicle compartment 2 (see FIG. 2) from the vehicle rear side is formed in the rear part of the vehicle 1. Further, the lift gate 4 having a shape matching with the shape of the vehicle body opening 3 and being formed to slant downwardly and toward the vehicle rear side is disposed in the rear part of the vehicle 1.

The lift gate 4 is supported to a vehicle body via a hinge (not illustrated) provided at an upper periphery of the vehicle body opening 3. As illustrated in FIG. 1 and FIG. 2, the lift gate 4 is configured to openably close the vehicle body opening 3 by pivotal movement of the lift gate 4 in the up-down direction around a hinge provided at an upper portion of the lift gate 4.

Further, a pair of rear pillars 7 and a pair of tail lamps 9 are disposed at the rear part of the vehicle 1. The rear pillars 7 are a member constituting left and right perimeters of the vehicle body opening 3. Each of the rear pillars 7 extends in the up-down direction in such a manner as to connect between a roof portion 5 and a rear bumper 6. The tail lamps 9 correspond to a "light source device" in the claims, and are respectively mounted on surfaces of the rear pillars 7 facing the inside of the vehicle 1.

Figure 3:
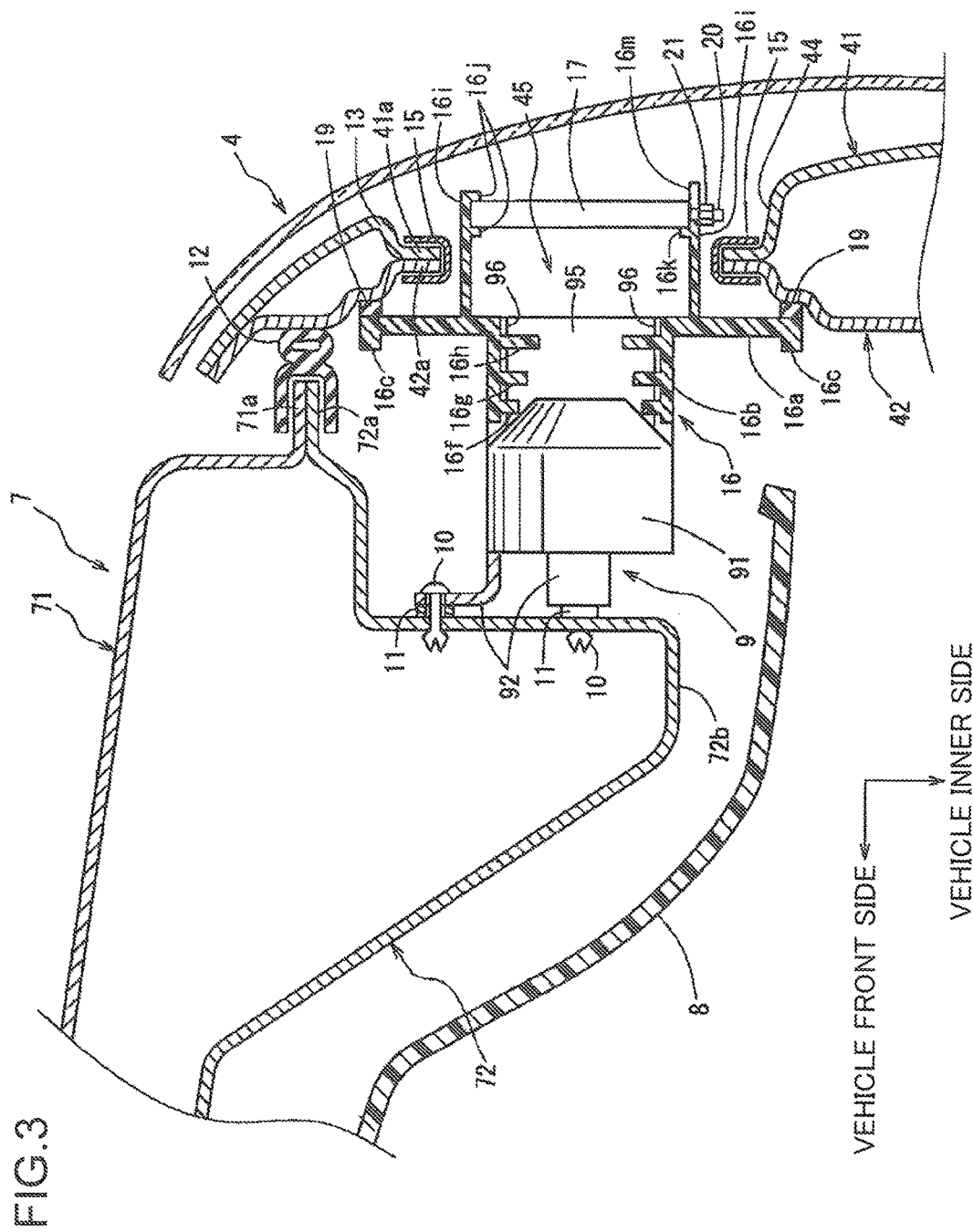
FIG. 3 is a horizontal sectional view illustrating the rear part of the vehicle.

FIG. 3 is a horizontal sectional view illustrating the rear part of the vehicle 1. As illustrated in FIG. 3, the rear pillar 7 is mainly constituted by an outer panel 71 on the vehicle outer side, and an inner panel 72 on the vehicle inner side. The outer panel 71 and the inner panel 72 are joined to each other by flange portions 71a and 72a at respective rear ends thereof. In this way, the rear pillar 7 has a closed section structure.

A portion of the inner panel 72 of the rear pillar 7 on the vehicle inner side is covered by a trunk side trim 8 constituting a side wall of the vehicle compartment 2. Further, as illustrated in FIG. 2 and FIG. 3, the inner panel 72 includes bulging portions 72b, each of which bulges inwardly in the vehicle width direction at a position away from and above a lower periphery of the vehicle body opening 3. The tail lamp 9 is mounted on the bulging portion 72b.

Figure 4:
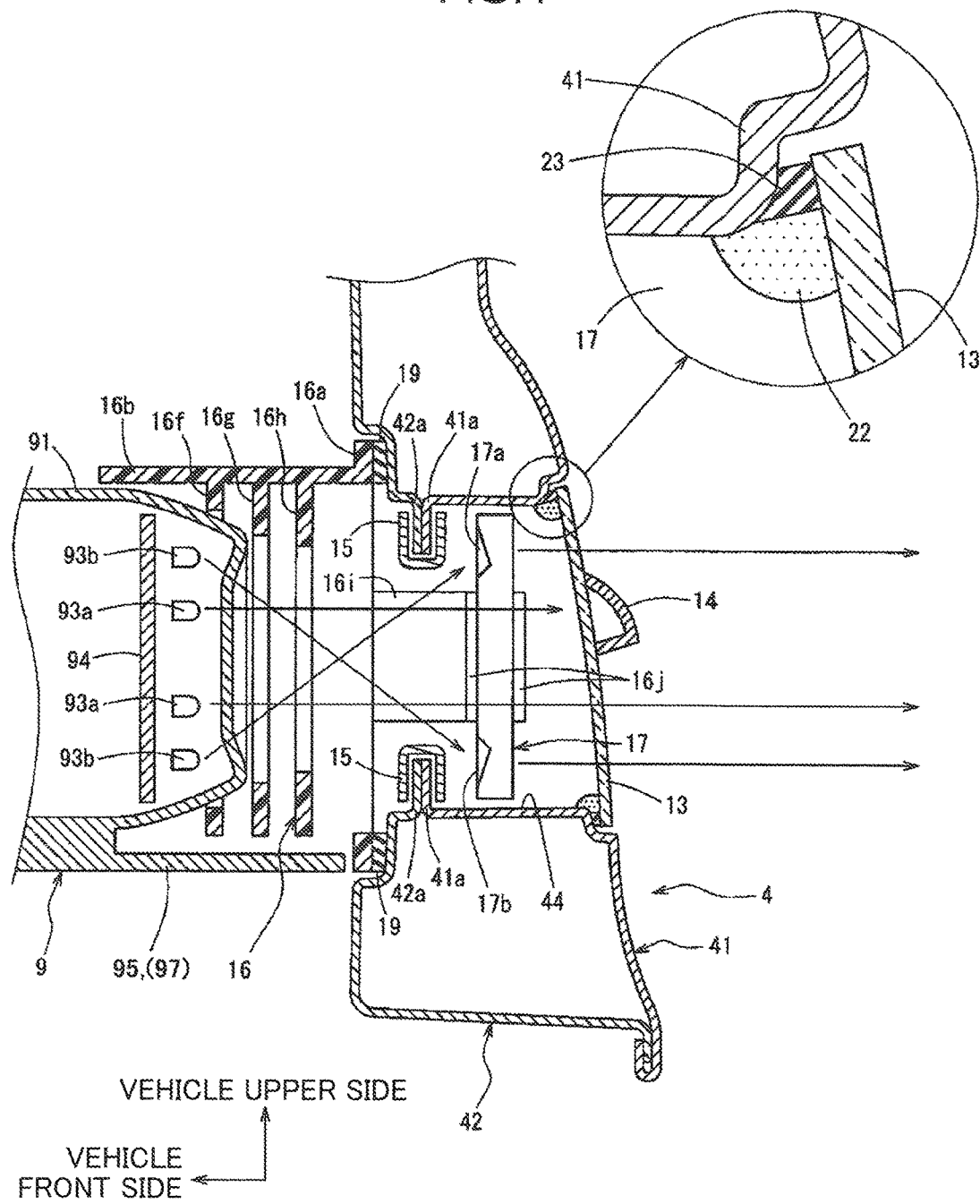
FIG. 4 is a sectional side view illustrating the rear part of the vehicle.
Figure 5:
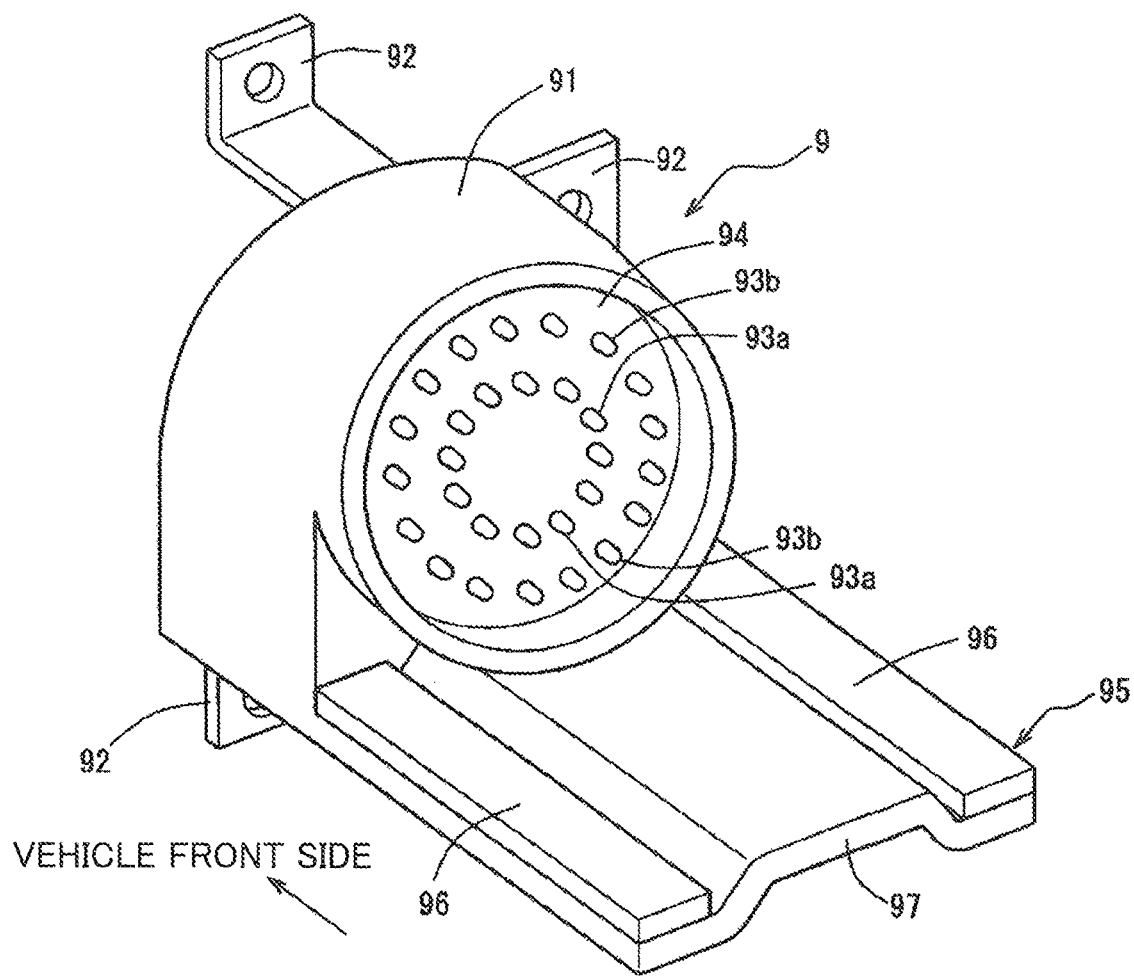
FIG. 5 is a perspective view illustrating a tail lamp.
Figure 6:
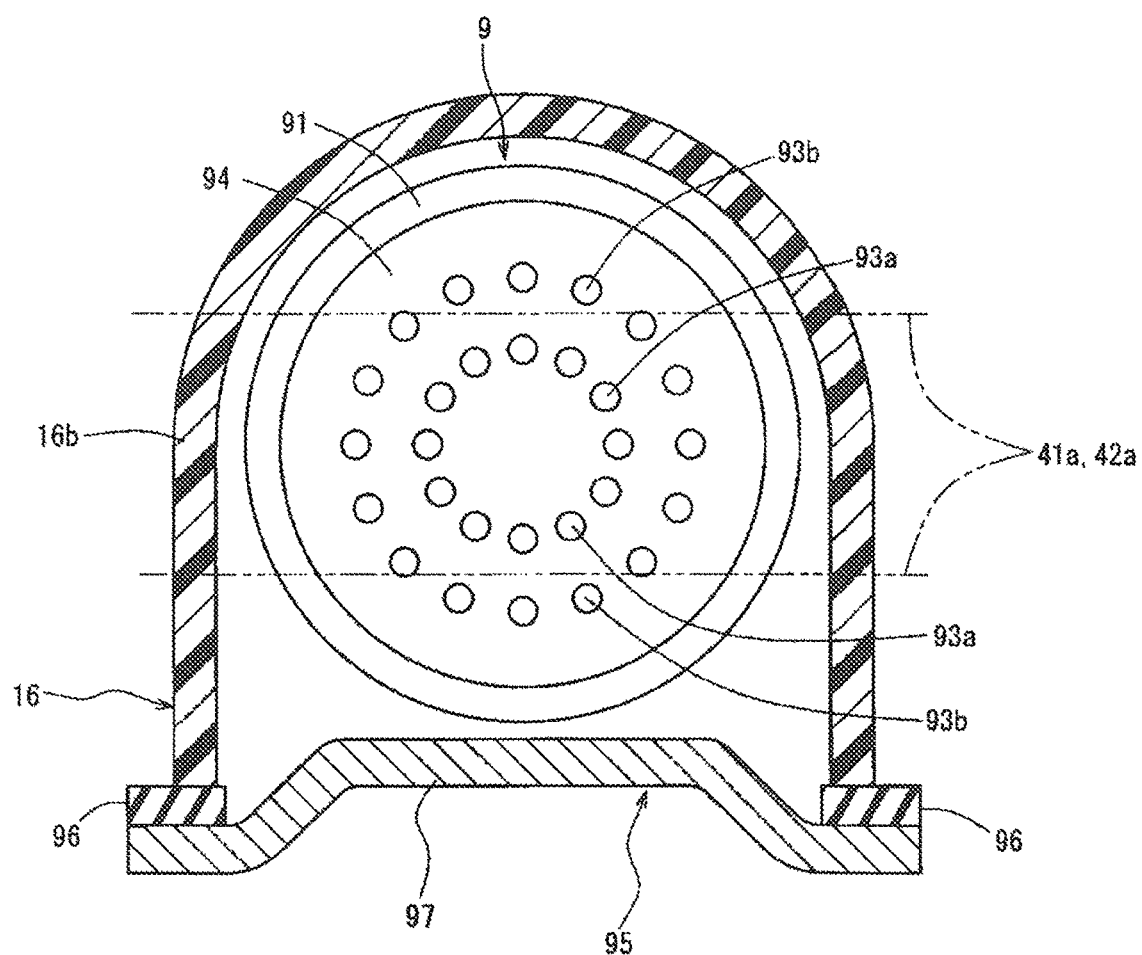
FIG. 6 is a front view illustrating the tail lamp.
Figure 7:
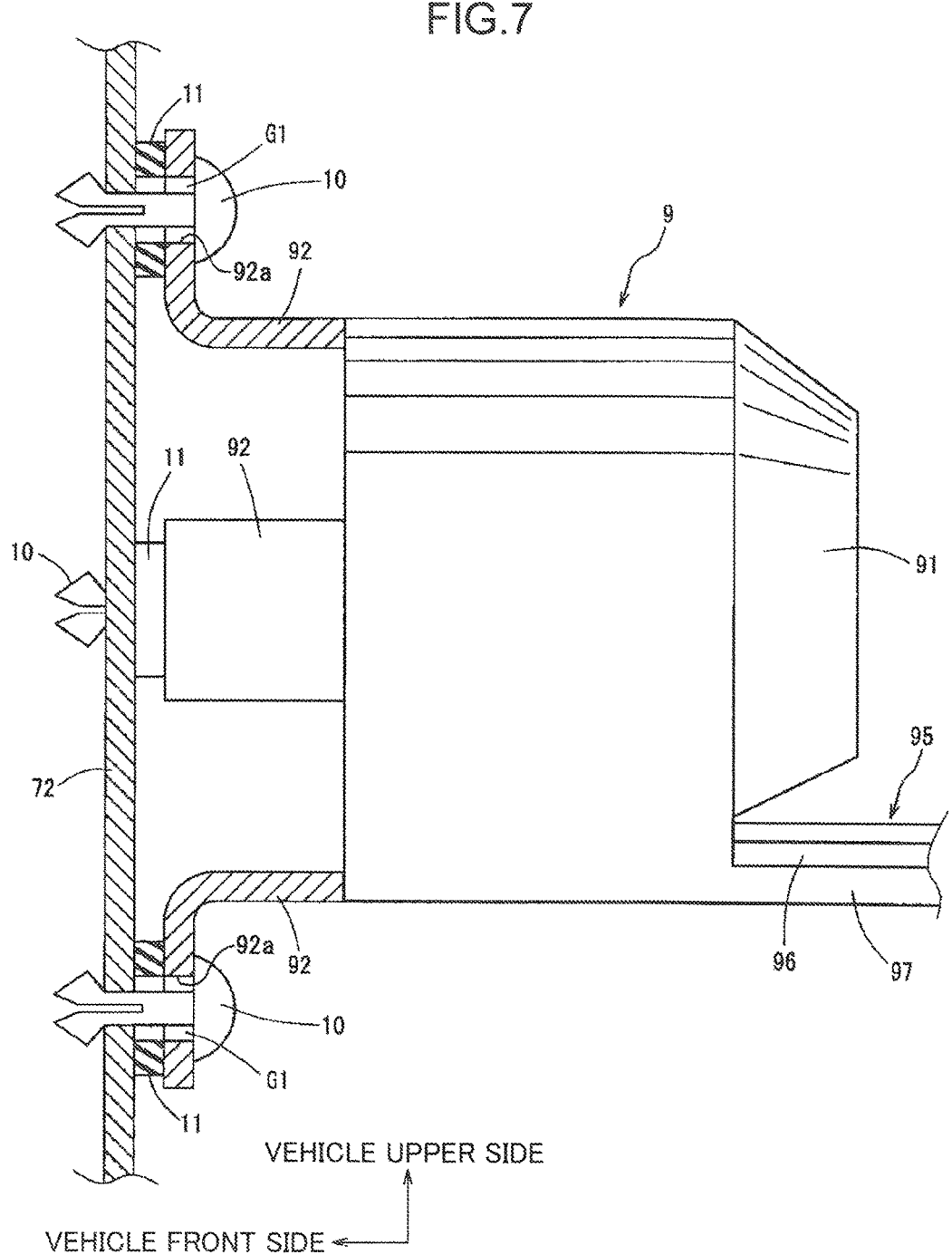
FIG. 7 is a sectional side view illustrating a state that the tail lamp is fixed to a vehicle body.

FIG. 4 is a sectional side view illustrating the rear part of the vehicle 1. FIG. 5 is a perspective view illustrating the tail lamp 9 and FIG. 6 is a front view illustrating the tail lamp 9. FIG. 7 is a sectional side view illustrating a state that the tail lamp 9 is fixed to a vehicle body. As illustrated in FIG. 2 to FIG. 7, the tail lamp 9 includes a substantially tubular-shaped housing portion 91, and a plurality of leg portions 92. As illustrated in FIG. 4 to FIG. 6, multitudes of LEDs 93a, 93a, . . . , and 93b, 93b . . . for radiating light toward the vehicle rear side are disposed on a substrate 94 on a rear surface portion of the housing portion 91 in such a manner that the LEDs 93a are disposed along an inner circumference and the LEDs 93b are disposed along an outer circumference. Note that the LEDs 93a and 93b correspond to a "light source" in the claims.

Further, a vehicle body-side light shielding portion 95, which projects toward the vehicle rear side than the rear surface portion (a portion where the LEDs 93a and 93b are disposed), is formed on a lower portion of a rear end of the housing portion 91. In other words, the lower side of the rear end of the housing portion 91 is covered by the vehicle body-side light shielding portion 95.

As illustrated in FIG. 5 to FIG. 7, the vehicle body-side light shielding portion 95 includes a main body portion 97, and a pair of rubber members 96 mounted on both ends of the main body portion 97 in the vehicle width direction. The main body portion 97 is a plate-shaped member integrally formed with the housing portion 91. A middle portion of the main body portion 97 in the vehicle width direction is formed to project upwardly as compared with both ends thereof in the vehicle width direction. The paired rubber members 96 are belt-like members each extending in the vehicle front-rear direction, and are respectively mounted on upper surfaces of both ends of the main body portion 97 in the vehicle width direction with a relatively small height. Note that the rubber members 96 correspond to a "contacted portion" in the claims.

Further, the leg portions 92 of the tail lamp 9 extend from a front end of the housing portion 91 toward the vehicle front side. As illustrated in FIG. 3 and FIG. 7, each of the leg portions 92 is mounted on the inner panel 72 (bulging portion 72b) of the rear pillar 7 by a clip 10. A rubber bush 11 is interposed between the inner panel 72 and each of the leg portions 92. A predetermined gap (so-called a play) G1 is formed between the leg portion 92 and the rubber bush 11, and the clip 10. Specifically, an insertion hole 92a (see FIG. 7) of an inner diameter larger than the diameter of a stem portion of the clip 10 by the size corresponding to the gap G1 is formed in the leg portion 92. Further, an insertion hole having the same inner diameter as the inner diameter of the insertion hole 92a is formed in the rubber bush 11. The clip 10 is engaged with the inner panel 72 in a state that the clip 10 is inserted through the insertion holes (the insertion hole 92a formed in the leg portion 92, and the insertion hole formed in the rubber bush 11). As described above, in the embodiment, the gap G1 is formed between the stem portion of the clip 10, and circumferential surfaces of the insertion holes. Therefore, it is possible to move the tail lamp 9 with respect to the vehicle body by the distance corresponding to the gap G1. In other words, in the embodiment, a mounting portion (corresponding to a light source mounting portion in the claims) for movably mounting the tail lamp 9 with respect to the vehicle body is constituted by the clips 10, the leg portions 92 in the vicinity of the insertion holes 92a, and the rubber bushes 11.

As illustrated in FIG. 1, FIG. 3, and FIG. 4, the lift gate 4 is disposed in such a manner as to cover the tail lamps 9 when the lift gate 4 is closed.

Figure 8:
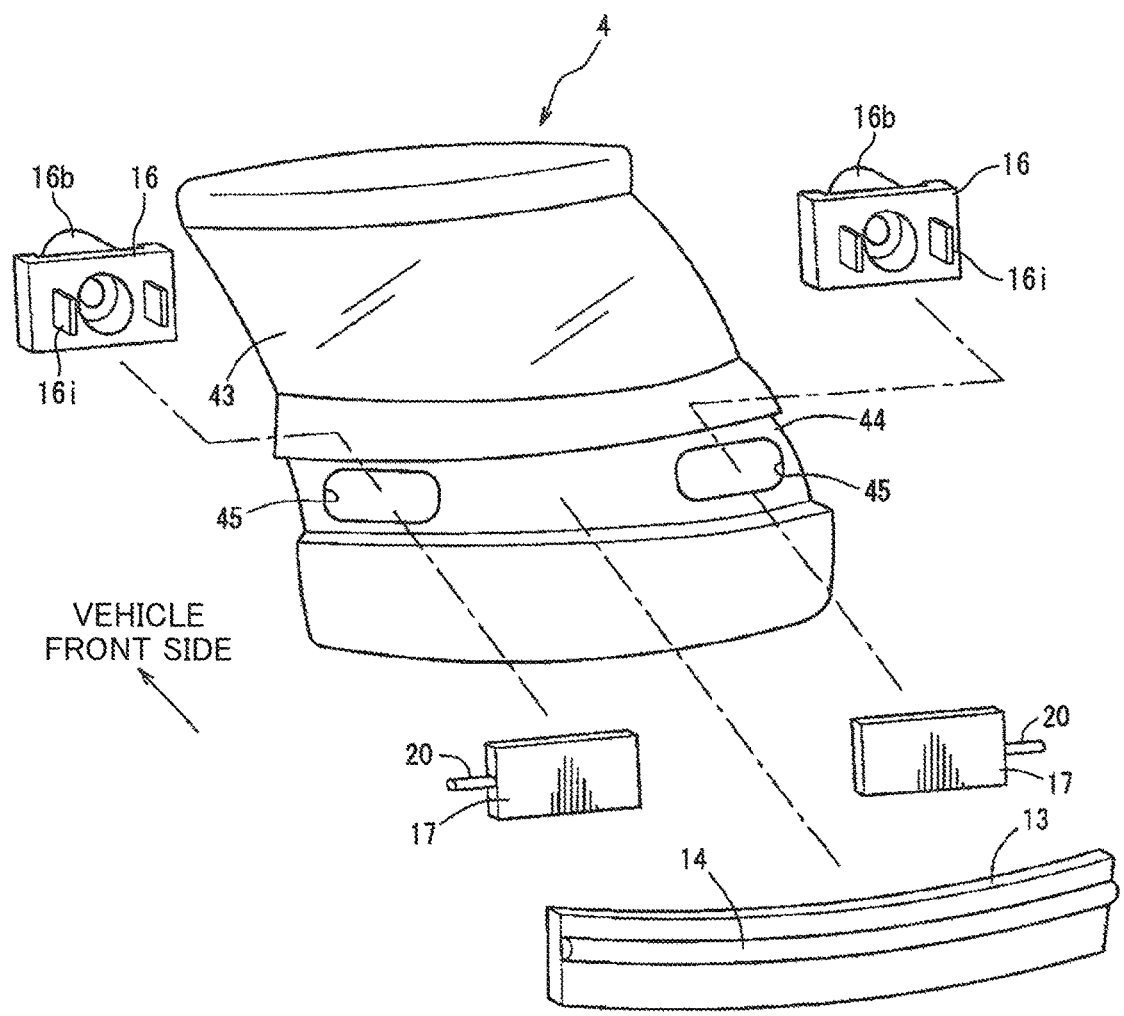
FIG. 8 is an exploded perspective view illustrating a structure of the lift gate.

FIG. 8 is an exploded perspective view illustrating a structure of the lift gate 4. As illustrated in FIG. 1 to FIG. 4, and FIG. 8, the lift gate 4 includes an outer panel 41 on the vehicle outer side, an inner panel 42 on the vehicle inner side, and a rear window shield 43. In this example, as illustrated in FIG. 3, a seal member 12 made of rubber is mounted on a joining portion between the flange portions 71a and 72a of the rear pillar 7. When the lift gate 4 is closed, a space between the lift gate 4 and the vehicle body is sealed by abutment of the peripheral portion of the inner panel 42 against the seal member 12.

Further, as illustrated in FIG. 2 to FIG. 4, and FIG. 8, a concave portion 44 concaved toward the tail lamp 9 side (toward the vehicle inner side) is formed to extend in the vehicle width direction at the same height position as the tail lamps 9 on the lift gate 4. A transparent or semi-transparent outer lens 13 extending in a belt-like manner over the entire width of the lift gate 4 is fitted in the concave portion 44. A signature 14 as a decorative member, which extends in a belt-like manner over the entire range of the outer lens 13 in the longitudinal direction thereof is mounted on the outer lens 13.

Further, opening portions 45 are formed in left and right ends of the concave portion 44 at positions corresponding to the tail lamps 9. The opening portions 45 are configured to transmit light from the tail lamps 9 toward the vehicle rear side when the lift gate 4 is closed. As illustrated in FIG. 3 and FIG. 4, the perimeters of the opening portions 45 are constituted by a flange portion 41a of the outer panel 41 and a flange portion 42a of the inner panel 42.

Each of the flange portion 41a and 42a projects toward the center of the opening portion 45, and the flange portions 41a and 42a are joined to each other. Further, the flange portions 41a and 42a are covered by a seaming welt 15 over the entire circumference of the opening portion 45. Further, as illustrated in FIG. 4 and FIG. 6 (in FIG. 6, an end perimeter of the flange portion 41a (42a) is indicated by the two-dotted chain line), each of the flange portions 41a and 42a is disposed to shield a part of the tail lamp 9 (specifically, upper and lower ends of the housing portion 91, and a upper and lower parts of the LEDs 93b, 93b, . . . ) when viewed from the vehicle rear side when the lift gate 4 is closed.

Further, as illustrated in FIG. 2 to FIG. 4, and FIG. 8, the lift gate 4 is provided with lift gate-side light shielding members 16 and inner lenses 17 at positions corresponding to the positions of the opening portions 45. Note that the lift gate-side light shielding members 16 correspond to a "light shielding member" in the claims, and the inner lenses 17 correspond to a "lens member" in the claims.

Figure 9:
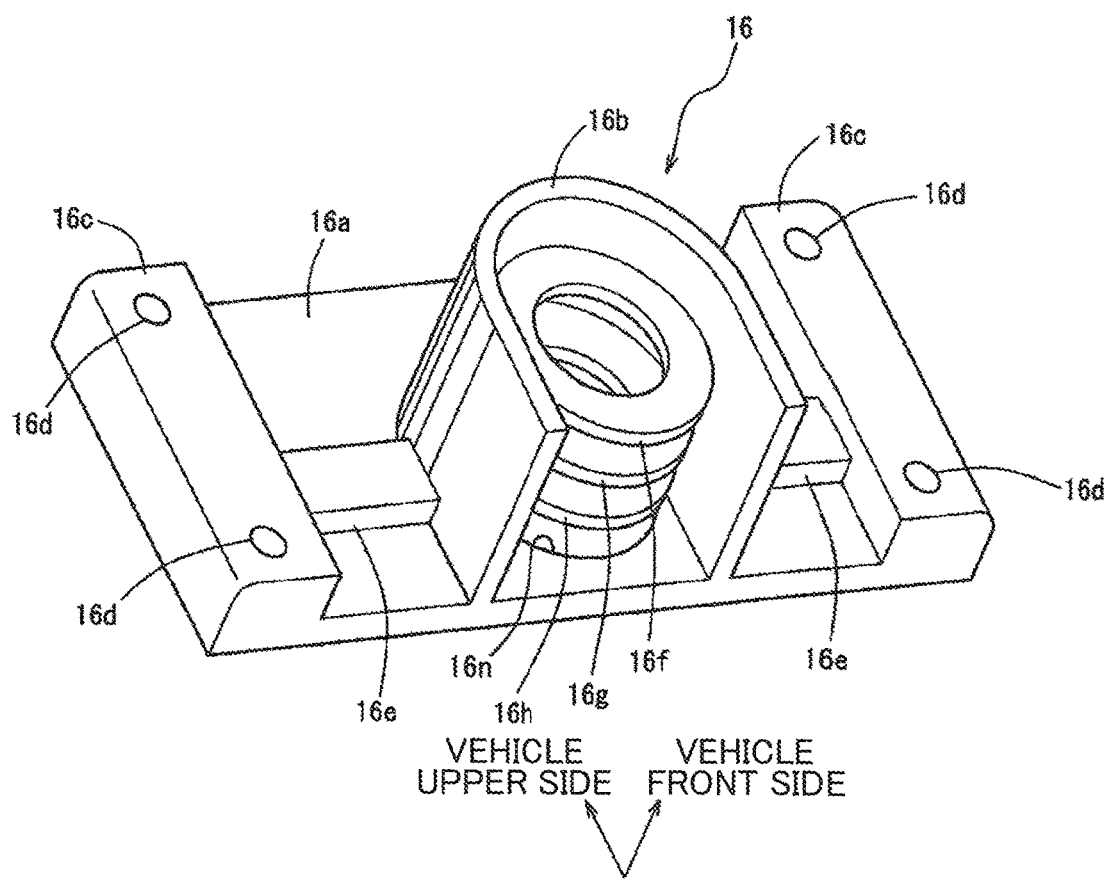
FIG. 9 is a perspective view illustrating a light shielding member.
Figure 10:
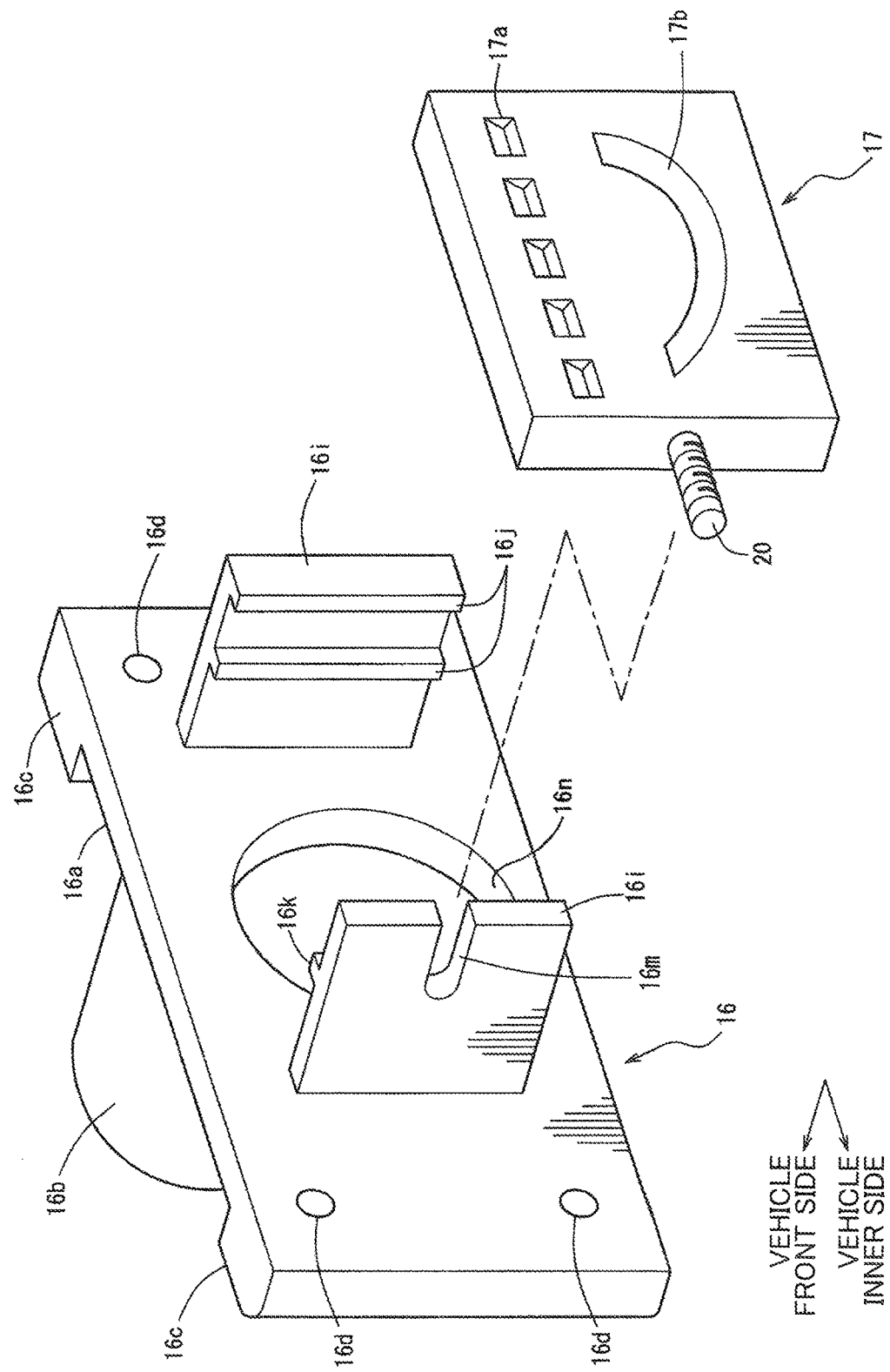
FIG. 10 is a perspective view illustrating the light shielding member and an inner lens.
Figure 11:
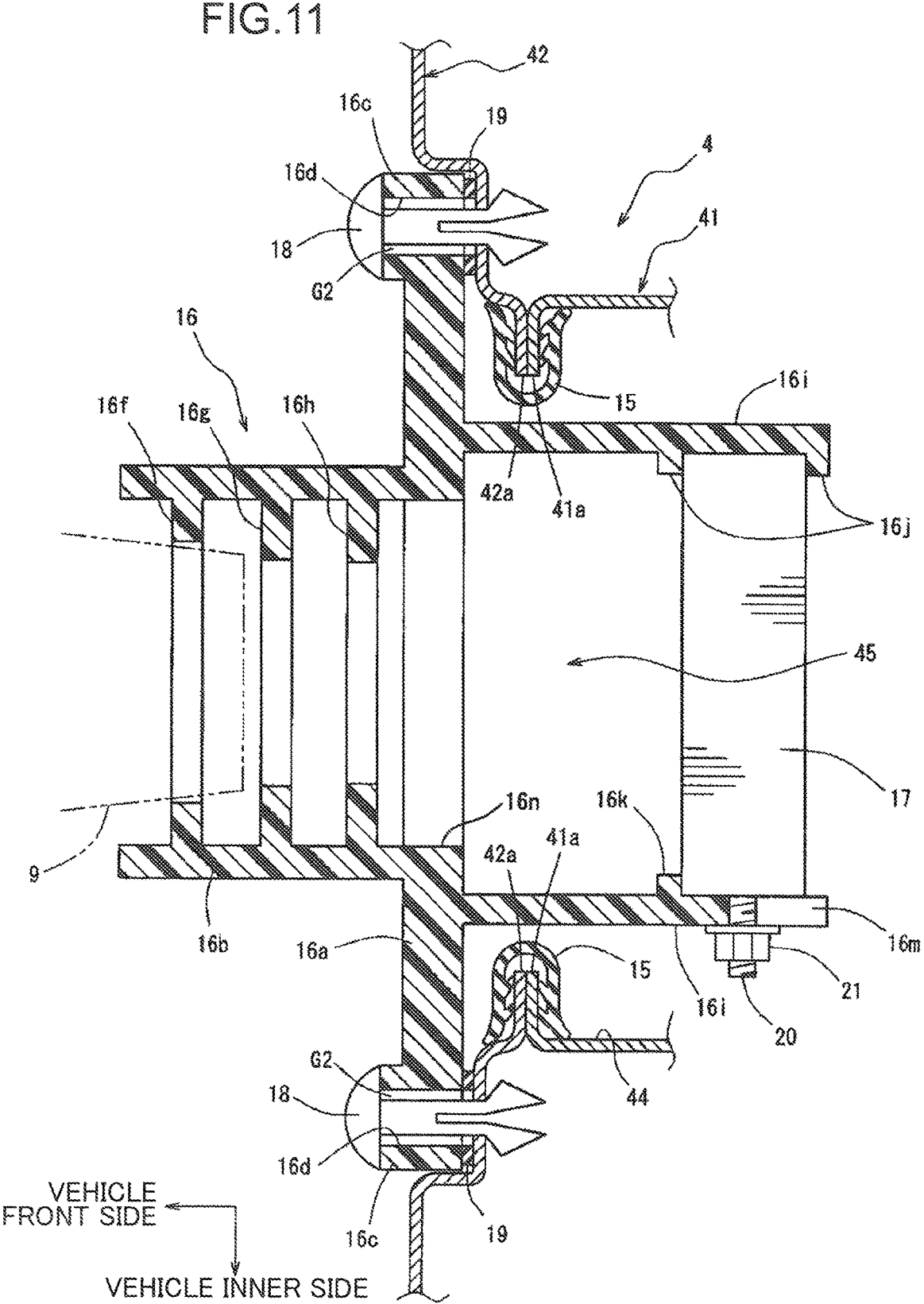
FIG. 11 is a sectional side view illustrating a state that the light shielding member and the inner lens are fixed to the lift gate.

FIG. 9 is a perspective view illustrating the lift gate-side light shielding member 16. FIG. 10 is a perspective view illustrating the lift gate-side light shielding member 16 and the inner lens 17. FIG. 11 is a sectional side view illustrating a state that the lift gate-side light shielding member 16 and the inner lens 17 are fixed to the lift gate 4. The lift gate-side light shielding member 16 is disposed between the lift gate 4 and the tail lamp 9 when the lift gate 4 is closed, and is configured to prevent light from the tail lamp 9 from leaking into the vehicle compartment 2. The lift gate-side light shielding member 16 is made of a material softer than the material of the tail lamp 9. As illustrated in FIG. 9 to FIG. 11, the lift gate-side light shielding member 16 mainly includes a substantially rectangular base portion 16a, and a light shielding portion 16b extending from the base portion 16a toward the vehicle front side.

The base portion 16a includes a pair of reinforcing portions 16c formed along left and right ends thereof, and a pair of rib portions 16e extending in the vehicle width direction in such a manner that each of the rib portions 16c connects between the corresponding reinforcing portion 16c and the light shielding portion 16b. The reinforcing portion 16c has a larger thickness than the thickness of the other part of the base portion 16a, and is formed to extend in the up-down direction at a position corresponding to the opening portion 45 in the lift gate 4.

The base portion 16a is disposed to cover the opening portion 45 in the lift gate 4 from the vehicle inner side. As illustrated in FIG. 11, four corners of the base portion 16a, namely, upper and lower ends of each of the left and right reinforcing portions 16c are mounted on a portion of the inner panel 42 in the vicinity of the opening portion 45 by clips 18. In this way, the lift gate-side light shielding member 16 is mounted on the lift gate 4. A rubber bush 19 is interposed between the inner panel 42, and the upper and lower ends of each of the reinforcing portions 16c. Further, a predetermined gap (so-called a play) G2 is formed between the reinforcing portion 16c and the rubber bush 19, and the clip 18. Specifically, an insertion hole 16d of an inner diameter larger than the diameter of a stem portion of the clip 18 by the size corresponding to the gap G2 is formed in the upper and lower ends of each of the reinforcing portions 16c (four corners of the base portion 16a). Further, an insertion hole of the same inner diameter as the inner diameter of the insertion hole 16d is formed in the rubber bush 19. The clip 18 is engaged with the inner panel 42 in a state that the clip 18 is inserted through the insertion holes (the insertion hole 16d formed in the base portion 16a, and the insertion hole formed in the rubber bush 19). As described above, in the embodiment, the gap G2 is formed between the stem portion of the clip 18, and circumferential surfaces of the insertion holes. Therefore, it is possible to move the lift gate-side light shielding member 16 with respect to the lift gate 4 by the distance corresponding to the gap G2. In other words, in the embodiment, a mounting portion (corresponding to a lens mounting portion in the claims) for movably mounting the lift gate-side light shielding member 16 with respect to the lift gate 4 is constituted by the clips 18, the reinforcing portions 16c in the vicinity of the insertion holes 16d, and the rubber bushes 19.

The light shielding portion 16b is formed to cover laterally of the tail lamp 9 and above the tail lamp 9 when the lift gate 4 is closed. In the embodiment, the light shielding portion 16b has an inverted U-shape such that a lower surface thereof is opened when viewed from the vehicle rear side. Further, three rib portions 16f, 16g, and 16h, each of which has a ring-like shape, are formed inside the light shielding portion 16b in an array in the vehicle front-rear direction. Further, a hole portion 16n is formed in the center of the base portion 16a surrounded by the light shielding portion 16b. Light from the tail lamp 9 is allowed to transmit toward the vehicle rear side through the inner portions of the rib portions 16f to 16h and through the hole portion 16n.

The three rib portions 16f to 16h in the light shielding portion 16b are formed in such a manner that the projection height thereof increases toward the vehicle rear side. Specifically, as illustrated in FIG. 3, FIG. 4, and FIG. 11, the projection height of the rib portion 16g at the intermediate position in the front-rear direction is set higher than the projection height of the rib portion 16f on the front side, and the projection height of the rib portion 16h on the rear side is set higher than the projection height of the rib portion 16g at the intermediate position.

The lift gate-side light shielding member 16 includes a pair of lens mounting portions 16i projecting toward the vehicle rear side on a surface thereof on the side opposite to the light shielding portion 16b. Two restricting convex portions 16j are formed on the inner surface of one of the lens mounting portions 16i in the vehicle width direction at positions away from each other by a predetermined distance in the vehicle front-rear direction. A restricting convex portion 16k facing the restricting convex portion 16j on the front side is formed on the inner surface of the other of the lens mounting portions 16i in the vehicle width direction. Further, a concave portion 16m for bolt mounting is formed in the other of the lens mounting portions 16i to be concave from a free end (rear end) thereof toward the vehicle front side.

The inner lens 17 is disposed in such a manner as to cover the opening portion 45 of the lift gate 4 from the vehicle outer side. As illustrated in FIG. 10, the inner lens 17 is formed with a plurality of rectangular refractive portions 17a (in this example, five refractive portions 17a), and an arc-shaped refractive portion 17b on a surface of the inner lens 17 on the side opposite to the tail lamp 9 (on the rear surface of the inner lens 17).

The inner lens 17 is substantially unmovably mounted on the lift gate-side light shielding member 16. More specifically, as illustrated in FIG. 3 and FIG. 11, a surface of the inner lens 17 in the vehicle width direction is received between the two restricting convex portions 16j and 16j formed on one of the lens mounting portions 16i and 16i. Further, as illustrated in FIG. 3, FIG. 8, FIG. 10, and FIG. 11, a stud bolt 20 is mounted upright on the other surface of the inner lens 17 in the vehicle width direction. The stud bolt 20 is engaged with a nut 21 in a state that the stud bolt 20 is received in the concave portion 16m for bolt mounting, which is formed in the other of the lens mounting portions 16i and 16i. In this way, the inner lens 17 is substantially unmovably fixed to the lift gate-side light shielding member 16 by being fastened and fixed to the paired lens mounting portions 16i and 16i with the use of the stud bolt 20 and the nut 21.

As described above, in the embodiment, the inner lens 17 is substantially unmovably fixed to the lift gate-side light shielding member 16. However, the lift gate-side light shielding member 16 is movably mounted with respect to the lift gate 4 via a mounting portion constituted by e.g. the clips 18, which are inserted through the insertion holes 16d with the gap G2. Therefore, the inner lens 17 is movable with respect to the lift gate 4 together with the lift gate-side light shielding member 16.

As described above, when the inner lens 17 is movable with respect to the lift gate 4, a configuration may be proposed, in which a sub-assembly is formed by fastening and fixing the inner lens 17 to the lift gate-side light shielding member 16, and the sub-assembly is fixed to the lift gate 4. However, in the embodiment, the inner lens 17 is formed to be larger than the opening portion 45. Therefore, it is impossible to set the inner lens 17 of the sub-assembly to a predetermined position through the opening portion 45 from the vehicle front side. In view of the above, in the embodiment, as described above, the paired lens mounting portions 16i and 16i projecting toward the vehicle rear side are formed on the lift gate-side light shielding member 16. This makes it possible to fasten and fix the inner lens 17 to the lift gate 4 after the lift gate-side light shielding member 16 is fixed to the lift gate 4.

Figure 12:
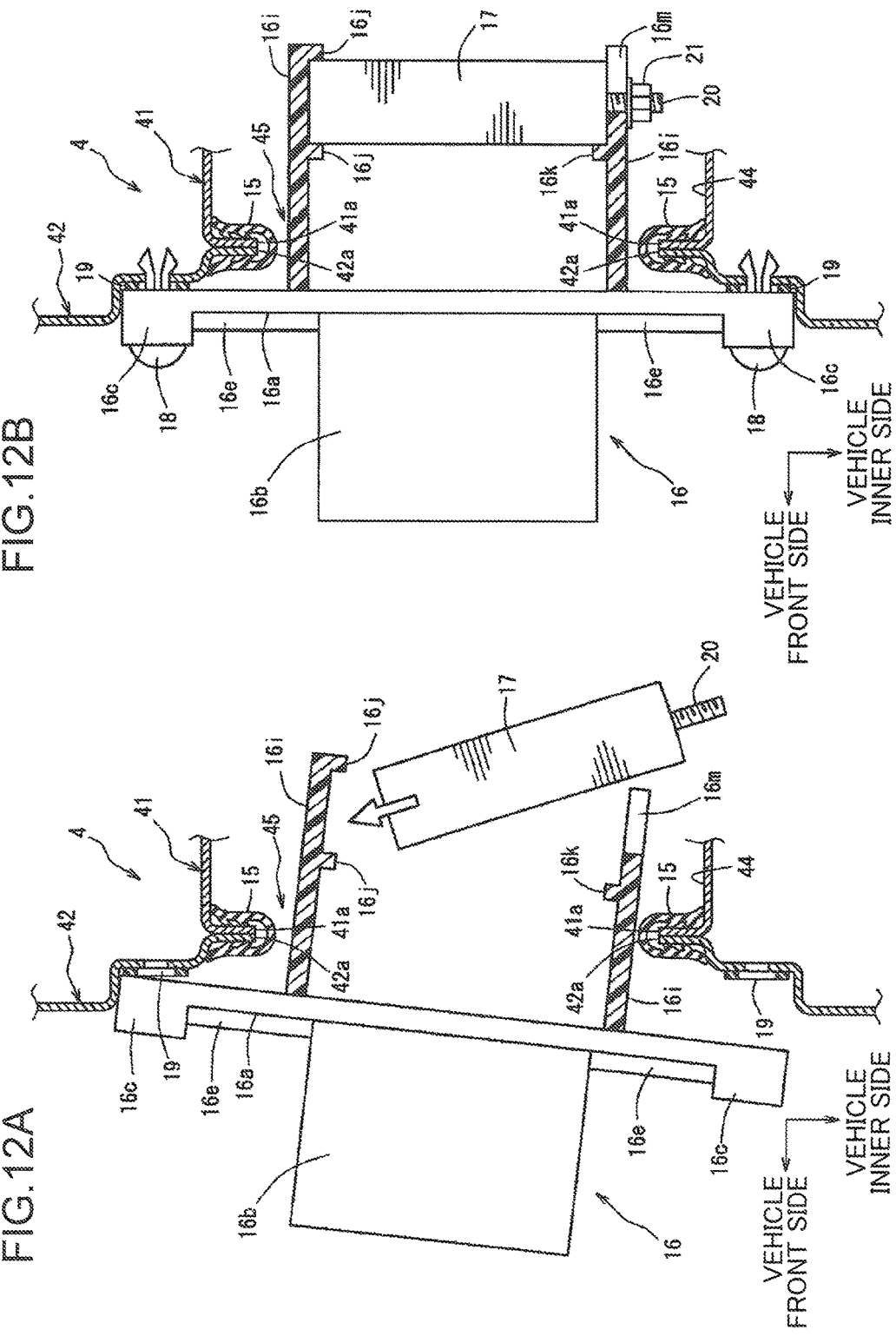
FIGS. 12A and 12B are explanatory diagrams for describing how the light shielding member and the inner lens are assembled.

Specifically, in fixing the lift gate-side light shielding member 16 and the inner lens 17 to the lift gate 4, as illustrated in FIG. 12A, first of all, the lens mounting portions 16i and 16i of the lift gate-side light shielding member 16 are allowed to pass through the opening portion 45 from the vehicle front side, and positioning of the entirety of the lift gate-side light shielding member 16 with respect to the lift gate 4 (inner panel 42) is performed. Then, the lift gate-side light shielding member 16 is mounted on the lift gate 4 (inner panel 42) by the clips 18. Then, a surface of the inner lens 17 in the vehicle width direction is received between the restricting convex portions 16j and 16j from the vehicle rear side and from below, and the stud bolt 20 on the other surface of the inner lens 17 in the vehicle width direction is received in the concave portion 16m for bolt mounting. Then, the nut 21 is engaged with the stud bolt 20 projecting from the lens mounting portion 16i through an unillustrated opening portion of the inner panel 42. In this way, as illustrated in FIG. 12B, the inner lens 17 is fastened and fixed to the paired lens mounting portions 16i and 16i. Thus, the inner lens 17 is fixed to the lift gate-side light shielding member 16.

As illustrated in FIG. 4, upper and lower ends of the outer lens 13 are respectively and adhesively mounted to upper and lower ends of the concave portion 44 of the lift gate 4 by an adhesive 22. Note that a dam member 23 made of polyurethane is mounted between the concave portion 44, and the upper and lower ends of the outer lens 13 in order to prevent oozing of the adhesive 22 to the outside.

In the embodiment, as described above, the lift gate 4 configured to be pivotally movable around an upper portion thereof is slanted downwardly and toward the vehicle rear side. According to this configuration, when the lift gate 4 is opened and closed, the lift gate-side light shielding members 16 are moved toward and away from the tail lamps 9 obliquely in the front-and-rear direction. On the other hand, in the embodiment, the lower surfaces of the lift gate-side light shielding members 16 (namely, the light shielding portions 16b) are opened. Therefore, there is no likelihood that the lift gate-side light shielding members 16 may impair an opening/closing operation of the lift gate 4.

Further, as illustrated in FIG. 4, when the lift gate 4 is closed, the rear end of the housing portion 91 of the tail lamp 9 is disposed inside the light shielding portion 16b of the lift gate-side light shielding member 16. In this case, as illustrated in FIG. 6, a lower end of the light shielding portion 16b is abutted against the paired rubber members 96 of the vehicle body-side light shielding portion 95.

Conceivably, there is a mounting error of the tail lamp 9 with respect to a vehicle body, a mounting error of the inner lens 17 with respect to the lift gate 4, or a positional deviation between a vehicle body and the lift gate 4. In the embodiment, however, the tail lamp 9 is movable with respect to a vehicle body, and the inner lens 17 (the lift gate-side light shielding member 16) is movable with respect to the lift gate 4. Therefore, when the lift gate 4 is closed, one of the tail lamp 9 and the inner lens 17, or both of the tail lamp 9 and the inner lens 17 are moved, as the lower end of the light shielding portion 16b is abutted against the rubber members 96. This makes it possible to absorb the mounting error or the positional deviation.

Specifically, when there is a mounting error or a positional deviation as described above, a positional relationship between the tail lamp 9 and the inner lens 17 may be deviated, and an appropriate positional relationship i.e. a positional relationship (hereinafter, referred to as a predetermined positional relationship) capable of obtaining an appropriate irradiation state through the inner lens 17 when the tail lamp 9 is turned on may be lost. However, in the embodiment, in which the tail lamp 9 and the inner lens 17 are movably mounted, when the lift gate 4 is closed, as the lower end of the light shielding portion 16b is abutted against the rubber members 96, at least one of the tail lamp 9 and the inner lens 17 is caused to move to a position where the aforementioned predetermined positional relationship is attained.

As described above, the embodiment is configured such that when the tail lamp 9 and the inner lens 17 do not have the aforementioned predetermined positional relationship, a positioning portion for moving at least one of the tail lamp 9 and the inner lens 17 when the lift gate 4 is closed is constituted by the lower end of the light shielding portion 16b and the rubber members 96 so as to obtain the aforementioned predetermined positional relationship.

Further, in a state that positioning between the tail lamp 9 and the inner lens 17 is performed by abutment of the lower end of the light shielding portion 16b against the rubber members 96, substantially the entire circumference of the rear end of the housing portion 91, upper, lower and lateral portions of the rear end of the housing portion 91 are covered by the lift gate-side light shielding member 16 and by the vehicle body-side light shielding portion 95. According to this configuration, when the LEDs 93a and 93b of the tail lamp 9 emit light, light from the tail lamp 9 is prevented from leaking into the vehicle compartment 2. In other words, a positioning operation and a light shielding operation as described above are concurrently performed by cooperation of the lift gate-side light shielding member 16 and the vehicle body-side light shielding portion 95.

As illustrated by the arrows in FIG. 4, although a part of light irradiated from the LEDs 93a on the inner side is shielded by the signature 14 of the outer lens 13, the rest of the light is irradiated toward the vehicle rear side through the inside of the light shielding portion 16b of the lift gate-side light shielding member 16, the inner lens 17, and the outer lens 13.

On the other hand, as illustrated by the arrows in FIG. 4, light irradiated from upper and lower parts of the LEDs 93b on the outer side is transmitted through the inside of the light shielding portion 16b of the lift gate-side light shielding member 16, and then, is refracted toward the vehicle rear side by the refractive portions 17a and 17b of the inner lens 17.

Specifically, although a part of light from the LEDs 93b on the lower side is shielded by the flange portions 41a and 42b of the lift gate 4, another part of the light is refracted toward the vehicle rear side by the refractive portions 17a on the upper side. In this way, light from the LEDs 93b on the lower side is irradiated toward the vehicle rear side in such a manner as to bypass the flange portions 41a and 42a.

Likewise, although a part of light from the LEDs 93b on the upper side is shielded by the flange portions 41a and 42a of the lift gate 4, another part of the light is refracted toward the vehicle rear side by the refractive portion 17b on the lower side. In this way, light from the LEDs 93b on the upper side is irradiated toward the vehicle rear side in such a manner as to bypass the flange portions 41a and 42a.

Figure 13:
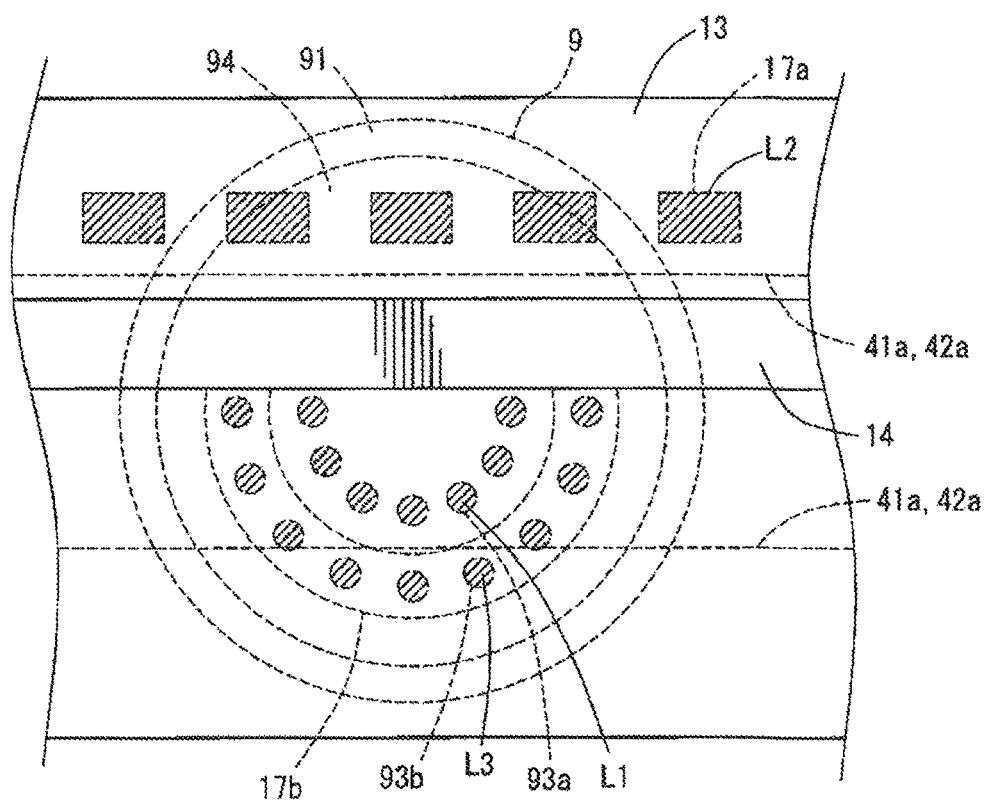
FIG. 13 is a front view illustrating a state that light is radiated from the lift gate toward the vehicle rear side.

In the embodiment, light as illustrated by the hatched portions L1 in FIG. 13 is irradiated from the LEDs 93a, 93a, . . . on the inner side, and from the center portion of the inner lens 17 (a portion between the refractive portions 17a and 17b). Further, light as illustrated by the hatched portions L2 in FIG. 13 is irradiated from the LEDs 93b, 93b, . . . on the outer and lower side, and from the refractive portion 17a. Furthermore, light as illustrated by the hatched portions L3 in FIG. 13 is irradiated from the LEDs 93b, 93b, . . . on the outer and upper side, the LEDs 93b, 93b, . . . on the middle portion, and from the refractive portion 17b.

In this way, in the embodiment, the inner lens 17 has a function as a prism for refracting light from the tail lamp 9 toward the vehicle rear side.

Further, in the embodiment, when an obstacle collides against the vehicle 1 from the rear side, and a load is input to the lift gate 4 toward the vehicle front side, a rear end of the tail lamp 9 (housing portion 91) is abutted against the rib portion 16f of the lift gate-side light shielding member 16 in an initial stage of collision. In this case, the height of the rib portion 16f is set relatively low as compared with the height of the rib portion 16g (16h). Therefore, a frictional force is only generated between the tail lamp 9 and the rib portion 16f of the lift gate-side light shielding member 16 with no or less deformation of the rib portion 16f. By generation of the frictional force, the load is moderately absorbed in the initial stage of collision.

Further, in a middle stage of collision or in a last stage of collision, the rear end of the tail lamp 9 (housing portion 91) reaches the rib portion 16g (16h) of the lift gate-side light shielding member 16. In this case, the height of the rib portion 16g (16h) is set relatively high as compared with the height of the rib portion 16f. Therefore, the rib portions 16g and 16h are successively deformed by a pressing force of the tail lamp 9. By the deformation of the rib portions 16g and 16h, in the middle stage of collision and in the last stage of collision, the load absorption is accelerated.

As described above, in the embodiment, each of the rib portions 16f to 16h has a function as a shock absorber for absorbing a load toward the vehicle front side when the load is input to the lift gate 4.

As described above, a rear part structure of the vehicle 1 in the first embodiment of the present invention is provided with the lift gate 4 which openably closes the vehicle body opening 3 formed in a rear part of the vehicle 1; the tail lamps 9 disposed on the rear pillars 7 (periphery of the vehicle body opening 3), and configured to be covered by the lift gate 4 when the lift gate 4 is closed; and the inner lenses 17 mounted in such a manner as to cover the opening portions 45 formed in the lift gate 4, and configured to transmit light from the tail lamps 9 when the lift gate 4 is closed. The tail lamps 9 are movably mounted with respect to the vehicle body via mounting portions such as the clips 10. The inner lenses 17 are substantially unmovably fixed to the lift gate-side light shielding members 16, which are formed on the front surface of the lift gate 4 (on a surface of the lift gate 4 facing the inside of the vehicle). The lift gate-side light shielding members 16 are movably mounted with respect to the lift gate 4 via mounting portions such as the clips 18. The lift gate-side light shielding member 16 includes the light shielding portion 16b for covering laterally of the tail lamp 9 and above the tail lamp 9, and including a lower surface thereof being opened. The tail lamp 9 includes the LEDs 93a and 93b, and the vehicle body-side light shielding portion 95 for covering a lower side of the tail lamp 9. The vehicle body-side light shielding portion 95 includes the rubber members 96 to be brought into contact with the lower end of the light shielding portion 16b when the lift gate 4 is closed. When the tail lamp 9 and the inner lens 17 do not have a predetermined positional relationship, at least one of the tail lamp 9 and the inner lens 17 is caused to move so as to obtain the aforementioned predetermined positional relationship by abutment of the lower end of the light shielding portion 16b against the rubber members 96 when the lift gate 4 is closed.

According to the aforementioned rear part structure of the vehicle 1, it is possible to implement a unique design by differentiating the external appearance of the tail lamp 9 between when the lift gate 4 is opened and when the lift gate 4 is closed.

Further, even if there is a mounting error of the tail lamp 9 with respect to a vehicle body, a mounting error of the inner lens 17 with respect to the lift gate 4, or a positional deviation between the vehicle body and the lift gate 4, when the lift gate 4 is closed, at least one of the tail lamp 9 and the inner lens 17 is caused to move. This makes it possible to absorb a mounting error or a positional deviation as described above. Therefore, it is possible to secure an intended positional relationship between the tail lamp 9 and the inner lens 17, and to secure an appropriate irradiation state through the inner lens 17 when the tail lamp 9 is turned on.

Further, the lift gate-side light shielding member 16 is provided on the front surface of the lift gate 4. This makes it possible to prevent light from the tail lamp 9 from leaking into the vehicle compartment 2. Further, it is possible to perform relative positioning between the tail lamp 9 and the inner lens 17 by using a part of the lift gate-side light shielding member 16.

Further, the vehicle body-side light shielding portion 95 for covering the lower side of the light source (LEDs 93a and 93b) is provided on the tail lamp 9, and the light shielding portion 16b of the lift gate-side light shielding member 16 has such a shape that the light shielding portion 16b covers laterally of the tail lamp 9 and above the tail lamp 9 (the lower surface of the light shielding portion 16b is opened). This makes it possible to secure sufficient light shielding performance by cooperation of the light shielding portion 16b and the vehicle body-side light shielding portion 95, while preventing that the lift gate-side light shielding member 16 may impair an opening/closing operation of the lift gate 4. Specifically, when the lift gate 4 is configured to be pivotally movable around an upper portion thereof as described in the first embodiment, and when it is attempted to shield light only by a light shielding member provided on the lift gate 4 side, it may be impossible to open the lower surface of the light shielding member, and the lower surface may impair an opening/closing operation of the lift gate 4. On the other hand, in the first embodiment, in which light is shielded as described above by cooperation of the lift gate-side light shielding member 16 and the vehicle body-side light shielding portion 95, it is possible to open the lower surface of the light shielding portion 16b of the lift gate-side light shielding member 16. Therefore, it is possible to prevent that the lift gate-side light shielding member 16 may impair an opening/closing operation of the lift gate 4, and to secure sufficient light shielding performance.

In addition to the above, it is possible to perform relative positioning between the tail lamp 9 and the inner lens 17 by using a part of the vehicle body-side light shielding portion 95, while securely allowing the vehicle body-side light shielding portion 95 to shield light from below the tail lamp 9.

FIG. 14 illustrates a rear part structure of a vehicle according to a second embodiment of the present invention. FIG. 14 is a sectional side view illustrating a state that a lift gate-side light shielding member 16, and an inner lens 17 are fixed to a lift gate 4. Note that in FIG. 14, constituent elements as those in the first embodiment illustrated in FIG. 1 to FIG. 13 are indicated by the same reference numerals, and description thereof is omitted herein.

Unlike the first embodiment, in the second embodiment illustrated in FIG. 14, a rubber bush 19 is not interposed between the lift gate 4 and the lift gate-side light shielding member 16. Further, there is no gap G2 between a reinforcing portion 16c (a circumferential surface of an insertion-hole 16d) and a clip 18. Therefore, the lift gate-side light shielding member 16 and the inner lens 17 are substantially unmovably fixed to the lift gate 4. On the other hand, as well as the first embodiment, a tail lamp 9 is movably mounted with respect to a vehicle body.

In other words, in the rear part structure of the vehicle 1 in the second embodiment, the inner lens 17 is substantially unmovably fixed to the lift gate 4, and the tail lamp 9 is movably mounted with respect to the vehicle body.

In the rear part structure of the vehicle 1 as described above, it is possible to appropriately secure the aforementioned irradiation state, while fixing a lens member (inner lens 17) on the lift gate 4 side at a predetermined position, which is defined in terms of design. In other words, there is no likelihood that the inner lens 17 may be deviated from the predetermined position when the lift gate 4 is closed. This makes it possible to secure the aforementioned irradiation state without sacrificing the external appearance of the vehicle when the lift gate 4 is closed.

Note that in the first and second embodiments, the tail lamp 9 is movably mounted with respect to a vehicle body. Alternatively, when an inner lens is movably mounted with respect to a lift gate, it is possible to substantially unmovably fix a tail lamp on a vehicle body.

Further, in the first and second embodiments, the vehicle body-side light shielding portion 95 is integrally formed with the tail lamp 9. Alternatively, the vehicle body-side light shielding portion 95 may be formed independently of the tail lamp 9.

Further, in the first and second embodiments, the LEDs 93a and 93b are employed as a light source to be used in the tail lamp 9. Alternatively, a light source may be e.g. a halogen lamp, in place of LEDs.

It is needless to say that various modifications are applicable as far as such modifications do not depart from the gist of the present invention.

The following is a summary of the features and the advantages effects disclosed in the aforementioned embodiments.

A rear part structure of a vehicle includes a lift gate which openably closes a vehicle body opening formed in a rear part of the vehicle; a light source device disposed on a periphery of the vehicle body opening, and configured to be covered by the lift gate when the lift gate is closed; a lens member mounted in such a manner as to cover an opening portion formed in the lift gate in order to transmit light from the light source device toward a rear side of the vehicle, the lens member being configured to transmit light from the light source device when the lift gate is closed; at least one of a light source mounting portion and a lens mounting portion, the light source mounting portion being configured to movably mount the light source device with respect to a vehicle body, the lens mounting portion being configured to movably mount the lens member with respect to the lift gate; and a positioning portion which causes, when the light source device and the lens member do not have a predetermined positional relationship therebetween, at least one of the light source device and the lens member to move into the predetermined positional relationship when the lift gate is closed.

According to the aforementioned configuration, it is possible to implement a unique design by differentiating the external appearance of the light source device between when the lift gate is opened and when the lift gate is closed.

Further, even if there is a mounting error of the light source device with respect to the vehicle body, a mounting error of the lens member with respect to the lift gate, or a positional deviation between the vehicle body and the lift gate, it is possible to absorb the mounting error and the positional deviation by causing at least one of the light source device and the lens member to move when the lift gate is closed. This makes it possible to secure an intended positional relationship between the light source device and the lens member, and to secure an appropriate irradiation state through the lens member when the light source device is turned on.

In the rear part structure of a vehicle, preferably, a surface of the lift gate facing an inside of the vehicle may be provided with a light shielding member to be disposed between the light source device and the lens member to prevent light from the light source device to leak into a vehicle compartment when the lift gate is closed. The lens member may be substantially unmovably fixed to the light shielding member. The lens mounting portion may movably mount the light shielding member with respect to the vehicle body. The positioning portion may be constituted by a part of the light shielding member, and a part of the light source device to be brought into contact with the part of the light shielding member when the lift gate is closed.

According to the aforementioned configuration, the light shielding member is provided on the surface of the lift gate facing the inside of the vehicle. This makes it possible to prevent light from the light source device to leak into the vehicle compartment. Further, it is possible to configure a positioning portion which performs relative positioning between the light source device and the lens member by using a part of the light shielding member.

In the aforementioned configuration, preferably, the lift gate may be pivotally mounted around an upper portion thereof. The light shielding member may include a light shielding portion which covers laterally of the light source device and above the light source device, the light shielding portion including a lower surface thereof being opened. The light source device may include a light source, and a vehicle body-side light shielding portion configured to cover below the light source. The vehicle body-side light shielding portion may include a contacted portion to be brought into contact with a lower end of the light shielding portion when the lift gate is closed. The positioning portion may be constituted by the lower end of the light shielding portion and the contacted portion.

According to the aforementioned configuration, the vehicle body-side light shielding portion which covers below the light source is provided in the light source device. Further, the light shielding portion of the light shielding member provided in the lift gate has such a shape that the light shielding portion covers laterally of the light source device and above the light source device (a lower surface of the light shielding portion is opened). This makes it possible to secure sufficient light shielding performance by cooperation of the light shielding portion of the light shielding member and the vehicle body-side light shielding portion, while preventing that the light shielding member may impair an opening/closing operation of the lift gate.

Further, it is possible to configure a positioning portion which performs relative positioning between the light source device and the lens member by using a part of the vehicle body-side light shielding portion, while securely allowing the vehicle body-side light shielding portion to shield light from below the light source device.

The lens member may be substantially unmovably fixed to the lift gate, and the light source device may be movably mounted with respect to the vehicle body via the light source mounting portion.

According to the aforementioned configuration, it is possible to secure the aforementioned irradiation state, while fixing the lens member on the lift gate side to the predetermined position, which is defined in terms of design. In other words, there is no likelihood that the lens member may be deviated from the predetermined position when the lift gate is closed. This makes it possible to secure the aforementioned irradiation state without sacrificing the external appearance of the vehicle when the lift gate is closed.

The invention claimed is:

1. A rear part structure of a vehicle, comprising:
   a lift gate which openably closes a vehicle body opening formed in a rear part of the vehicle;
   a light source device disposed on a periphery of the vehicle body opening, and configured to be covered by the lift gate when the lift gate is closed;
   a lens member mounted in such a manner as to cover an opening portion formed in the lift gate in order to transmit light from the light source device toward a rear side of the vehicle, the lens member being configured to transmit light from the light source device when the lift gate is closed;
   at least one of a light source mounting portion and a lens mounting portion, the light source mounting portion being configured to movably mount the light source device with respect to a vehicle body, the lens mounting portion being configured to movably mount the lens member with respect to the lift gate; and
   a positioning portion which causes, when the light source device and the lens member do not have a predetermined positional relationship therebetween, at least one of the light source device and the lens member to move into the predetermined positional relationship as a result of closing motion of the lift gate,
   wherein the positioning portion is disposed on the vehicle body,
   a surface of the lift gate facing an inside of the vehicle is provided with a light shielding member to be disposed between the light source device and the lens member to prevent light from the light source device from leaking into a vehicle compartment when the lift gate is closed, and
   the positioning portion is constituted by a part of the light shielding member, and a part of the light source device to be brought into contact with another part of the light shielding member as a result of the closing motion of the lift gate.

2. The rear part structure of a vehicle according to claim 1, wherein
   the lift gate is pivotally mounted around an upper portion thereof,
   the light shielding member includes a light shielding portion which covers laterally of the light source device and above the light source device, the light shielding portion including a lower surface thereof being opened,
   the light source device includes a light source, and a vehicle body-side light shielding portion configured to cover below the light source,
   the vehicle body-side light shielding portion includes a contacted portion to be brought into contact with a lower end of the light shielding portion as a result of the closing motion of the lift gate, and the positioning portion is constituted by the lower end of the light shielding portion and the contacted portion.

3. The rear part structure of a vehicle according to claim 1, wherein
the lens member is substantially unmovably fixed to the lift gate, and
the light source device is movably mounted with respect to the vehicle body via the light source mounting portion.

4. A rear part structure of a vehicle, comprising:
a lift gate which openably closes a vehicle body opening formed in a rear part of the vehicle;
a light source device disposed on a periphery of the vehicle body opening, and configured to be covered by the lift gate when the lift gate is closed;
a lens member mounted in such a manner as to cover an opening portion formed in the lift gate in order to transmit light from the light source device toward a rear side of the vehicle, the lens member being configured to transmit light from the light source device when the lift gate is closed;
at least one of a light source mounting portion and a lens mounting portion, the light source mounting portion being configured to movably mount the light source device with respect to a vehicle body by a rubber member, the lens mounting portion being configured to movably mount the lens member with respect to the lift gate;
a light shielding member formed to laterally cover the light source device; and
a positioning portion which causes, when the light source device and the lens member do not have a predetermined positional relationship therebetween, at least one of the light source device and the lens member to move into the predetermined positional relationship as a result of closing motion of the lift gate, due to a lower end of the light shielding part abutting against the rubber member,
wherein a surface of the lift gate facing an inside of the vehicle is provided with the light shielding member to be disposed between the light source device and the lens member to prevent light from the light source device from leaking into a vehicle compartment when the lift gate is closed, and the positioning portion is constituted by a part of the light shielding member, and a part of the light source device to be brought into contact with another part of the light shielding member as a result of the closing motion of the lift gate.

5. A rear part structure of a vehicle, comprising:
a lift gate which openably closes a vehicle body opening formed in a rear part of the vehicle;
a light source device disposed on a periphery of the vehicle body opening, and configured to be covered by the lift gate when the lift gate is closed;
a lens member mounted in such a manner as to cover an opening portion formed in the lift gate in order to transmit light from the light source device toward a rear side of the vehicle, the lens member being configured to transmit light from the light source device when the lift gate is closed;
at least one of a light source mounting portion and a lens mounting portion, the light source mounting portion being configured to movably mount the light source device with respect to a vehicle body, the lens mounting portion being configured to movably mount the lens member with respect to the lift gate; and
a positioning portion which causes, when the light source device and the lens member do not have a predetermined positional relationship therebetween, at least one of the light source device and the lens member to move into the predetermined positional relationship as a result of closing motion of the lift gate, by correcting the position of the light source device and the lens member relative to the vertical direction of the vehicle,
wherein a surface of the lift gate facing an inside of the vehicle is provided with a light shielding member to be disposed between the light source device and the lens member to prevent light from the light source device from leaking into a vehicle compartment when the lift gate is closed, and
the positioning portion is constituted by a part of the light shielding member, and a part of the light source device to be brought into contact with another part of the light shielding member as a result of the closing motion of the lift gate.

* * * * *